(12) United States Patent
Park et al.

(10) Patent No.: US 11,973,356 B2
(45) Date of Patent: Apr. 30, 2024

(54) METHOD AND ELECTRONIC DEVICE FOR PROVIDING FAST CHARGING

(71) Applicant: Samsung Electronics Co., Ltd., Gyeonggi-do (KR)

(72) Inventors: Youngmin Park, Gyeonggi-do (KR); Dongrak Shin, Gyeonggi-do (KR); Wookwang Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 295 days.

(21) Appl. No.: 17/533,221

(22) Filed: Nov. 23, 2021

(65) Prior Publication Data

US 2022/0131393 A1 Apr. 28, 2022

Related U.S. Application Data

(63) Continuation of application No. PCT/KR2021/014796, filed on Oct. 21, 2021.

(30) Foreign Application Priority Data

Oct. 23, 2020 (KR) .................... 10-2020-0138634

(51) Int. Cl.
*H01M 10/44* (2006.01)
*G06F 1/26* (2006.01)
(Continued)

(52) U.S. Cl.
CPC .......... *H02J 7/00034* (2020.01); *G06F 1/266* (2013.01); *H02J 7/0044* (2013.01); *H02J 7/342* (2020.01); *H02J 2207/30* (2020.01)

(58) Field of Classification Search
CPC ...... H02J 7/00034; H02J 7/0044; H02J 7/342; H02J 2207/30; H02J 7/0045; G06F 1/266
(Continued)

(56) References Cited

U.S. PATENT DOCUMENTS 9,577,452 B2   2/2017   Kuan
2007/0188134 A1   8/2007   Hussain et al.
(Continued)

FOREIGN PATENT DOCUMENTS

EP   3 490 097 A1   5/2019
JP   2017-521990 A   8/2017
(Continued)

OTHER PUBLICATIONS

International Search Report dated Jan. 26, 2022.
Written Opinion dated Jan. 26, 2022.
European Search Report dated Feb. 5, 2024.

*Primary Examiner* — Edward Tso
(74) *Attorney, Agent, or Firm* — Cha & Reiter, LLC

(57) ABSTRACT

According to an embodiment, an electronic device may include: a power management module; a USB connection terminal; a processor operably connected to the power management module and the USB connection terminal; and a memory operably connected to the processor. The memory may store instructions that, when executed, cause the processor to: provide, in response to connection with an external electronic device through the USB connection terminal, fast charging related information to the external electronic device; obtain power based on the fast charging related information from the external electronic device; perform a fast charging operation through the power management module based on the obtained power; determine to enter a first mode for data communication with the external electronic device; and determine whether fast charging is possible in the external electronic device based on the obtained power and an entry into the first mode by the electronic device and the external electronic device.

20 Claims, 7 Drawing Sheets

(51) Int. Cl.
*H01M 10/46* (2006.01)
*H02J 7/00* (2006.01)
*H02J 7/34* (2006.01)

(58) Field of Classification Search
USPC ................ 320/106, 107, 124, 125, 132, 160
See application file for complete search history.

(56) References Cited

U.S. PATENT DOCUMENTS

| | | | |
|---|---|---|---|
| 2009/0100275 A1* | 4/2009 | Chang | H02J 7/00 713/300 |
| 2014/0223212 A1* | 8/2014 | Wu | G06F 1/28 713/323 |
| 2015/0172589 A1 | 6/2015 | Onodera et al. | |
| 2017/0201052 A1 | 7/2017 | Peng et al. | |
| 2017/0207648 A1 | 7/2017 | Xiao | |
| 2018/0062409 A1 | 3/2018 | Jung et al. | |
| 2018/0224913 A1* | 8/2018 | Kaestner | G06F 1/266 |
| 2019/0131810 A1 | 5/2019 | Lim et al. | |
| 2019/0280504 A1 | 9/2019 | Lee et al. | |
| 2020/0153256 A1 | 5/2020 | Park et al. | |
| 2020/0272404 A1 | 8/2020 | Mu | |
| 2022/0013968 A1 | 1/2022 | Lee et al. | |
| 2022/0171445 A1 | 6/2022 | Kim | |

FOREIGN PATENT DOCUMENTS

| | | |
|---|---|---|
| KR | 10-2013-0108903 A | 10/2013 |
| KR | 10-2014-0008784 A | 1/2014 |
| KR | 10-2016-0027752 A | 3/2016 |
| KR | 10-2018-0018049 A | 2/2018 |
| KR | 10-1894195 B1 | 9/2018 |
| KR | 10-2019-0000690 A | 1/2019 |
| KR | 10-2020-0061748 A | 6/2020 |
| KR | 10-2020-0078593 A | 7/2020 |
| KR | 10-2021-0021858 A | 3/2021 |

* cited by examiner

METHOD AND ELECTRONIC DEVICE FOR PROVIDING FAST CHARGING

CROSS-REFERENCE TO RELATED APPLICATION

This application is a continuation application, claiming the benefit priority under § 365(c), of an International application No. PCT/KR2021/014796, filed on Oct. 21, 2021, which is based on and claims the benefit of a Korean patent application number 10-2020-0138634, filed on Oct. 23, 2020, in the Korean Intellectual Property Office, the disclosure of each of which is incorporated by reference herein in its entirety.

TECHNICAL FIELD

One or more embodiments of the instant disclosure generally relate to a method and electronic device for fast charging.

BACKGROUND ART

Electronic devices such as a mobile device may use a battery having limited power capability as a power source for portability and mobility. The usage time of the electronic device may be limited due to the limited power capability of the battery. The battery having the limited capability may be charged to continuously supply power to the electronic device.

The mobile electronic device may receive power from an external electronic device (e.g., charging device) connected to the electronic device through a cable, and may charge the battery thereof based on the received power. For example, the cable may electrically connect the electronic device and the external electronic device, and may function as a path for supplying power and a path for transmitting and receiving data signals.

SUMMARY

The cable electrically connecting an electronic device and an external electronic device (e.g., charging device) may include a universal serial bus (USB) cable (e.g., USB Type-C cable, or C-to-C cable). The electronic device may supply power or transmit and receive data between the electronic device and the external electronic device through the USB cable. For example, the electronic device may receive power from the external electronic device according to the USB power delivery (PD) standard, and may charge the battery based on the received power.

When the electronic device and the external electronic device are electrically connected through the USB cable (e.g., USB Type-C cable), the electronic device may receive power for battery charging from the external electronic device using a power delivery integrated circuit (PDIC). However, vendor defined message (VDM) communication with the external electronic device may be not implemented in the electronic device if algorithms related to VDM are not implemented, and data may be not exchanged between them.

Certain embodiments of the disclosure disclose a fast charging method based on data exchange between an electronic device and an external electronic device.

According to an embodiment, an electronic device may include: a power management module; a USB connection terminal; a processor operably connected to the power management module and the USB connection terminal; and a memory operably connected to the processor. The memory may store instructions that, when executed, cause the processor to: provide, in response to connection with an external electronic device through the USB connection terminal, fast charging related information to the external electronic device; obtain power based on the fast charging related information from the external electronic device; perform a fast charging operation through the power management module based on the obtained power; determine to enter a first mode for data communication with the external electronic device; and determine whether fast charging is possible in the external electronic device based on the obtained power and an entry into the first mode by the electronic device and the external electronic device.

According to an embodiment, an external electronic device may include: a power management module; a USB connection terminal; a processor operably connected to the power management module and the USB connection terminal; and a memory operably connected to the processor. The memory may store instructions that, when executed, cause the processor to: request, in response to connection with an electronic device through the USB connection terminal, fast charging related information from the electronic device; obtain fast charging related information from the electronic device; determine whether to perform a fast charging operation based on the obtained fast charging related information; supply power to the electronic device through the power management module based on the obtained fast charging related information to perform the fast charging operation; request, for data communication with the electronic device, the electronic device to enter a first mode; and perform data communication with the electronic device in the first mode according to the request.

According to an embodiment, a method may include: providing, in a state where an electronic device and an external electronic device are connected through a USB cable, by the electronic device, fast charging related information to the external electronic device in response to a request of the external electronic device; obtaining, by the electronic device, power based on the provided fast charging related information from the external electronic device; performing, by the electronic device, a fast charging operation based on the obtained power; entering a first mode for data communication between the electronic device and the external electronic device; and determining, by the electronic device, whether fast charging is possible in the external electronic device based on the obtained power and an entry into the first mode by the electronic device and the external electronic device.

According to certain embodiments of the disclosure, when an electronic device and external electronic device supporting USB (e.g., USB Type-C) are electrically connected through the USB cable, data communication (e.g., vendor defined message (VDM) communication) may be implemented therebetween. Through data communication, the electronic device may check whether the external electronic device supports fast charging, and may maintain the fast charging operation even if the fast charging direction is swapped. In addition, various effects directly or indirectly identified through this document may be provided.

DESCRIPTION OF DRAWINGS

The above and other aspects, features, and advantages of the present disclosure will be more apparent from the following description taken in conjunction with the accompanying drawings, in which.

DETAILED DESCRIPTION

Figure 1:
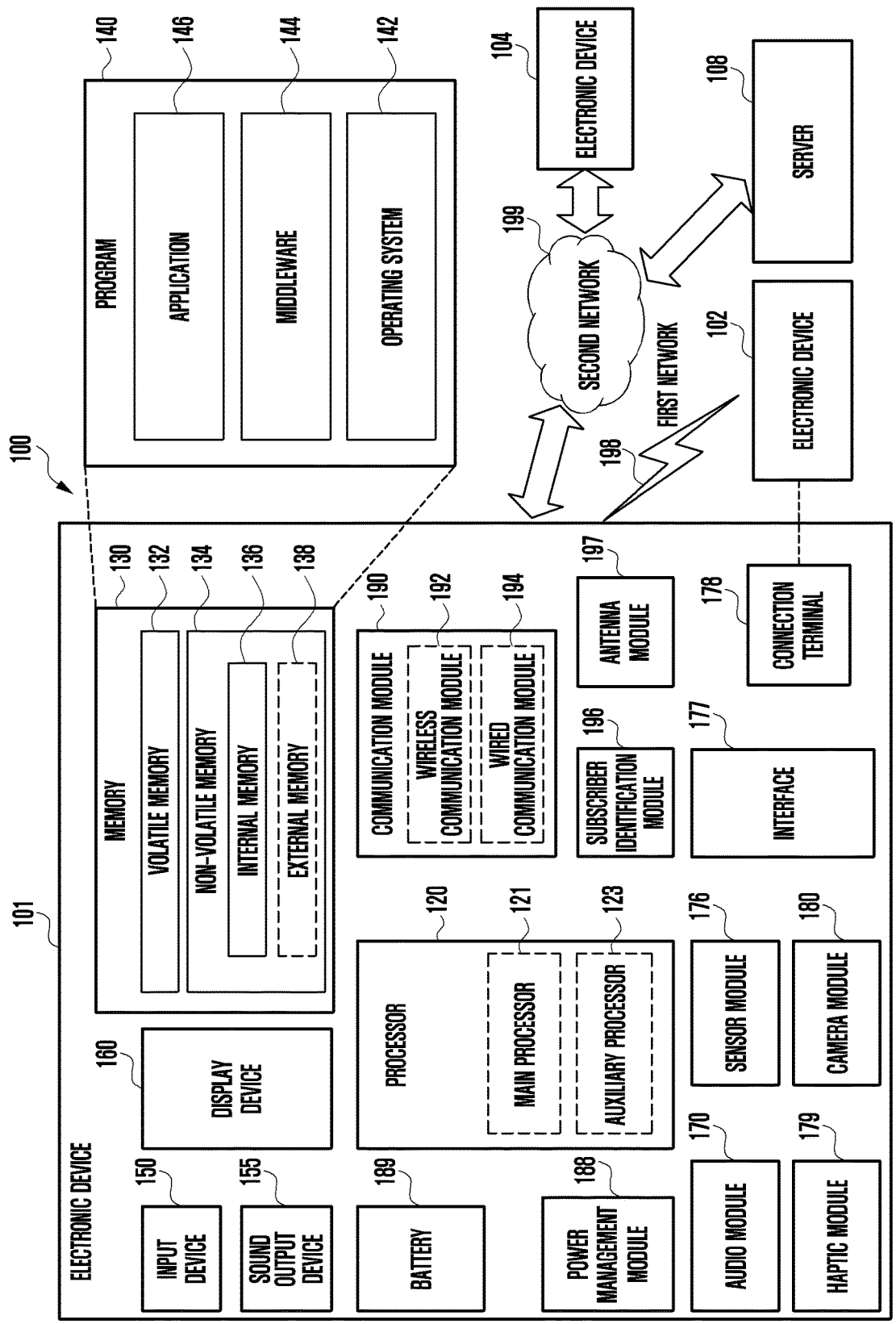
FIG. 1 is a block diagram illustrating an electronic device in a network environment according to an embodiment of the disclosure.

FIG. 1 illustrates an electronic device in a network environment according to an embodiment of the disclosure. Referring to FIG. 1, an electronic device 101 in a network environment 100 may communicate with an electronic device 102 via a first network 198 (e.g., a short-range wireless communication network), or at least one of electronic device 104 or a server 108 via a second network 199 (e.g., a long-range wireless communication network). The electronic device 101 may communicate with the electronic device 104 via the server 108. The electronic device 101 includes a processor 120, memory 130, an input module 150, an audio output module 155, a display module 160, an audio module 170, a sensor module 176, an interface 177, a connecting terminal 178, a haptic module 179, a camera module 180, a power management module 188, a battery 189, a communication module 190, a subscriber identity module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The audio output module 155 may output sound signals to the outside of the electronic device 101. The audio output module 155 may include, for example, a speaker or a receiver. The speaker may be used for general purposes, such as playing multimedia or playing record. The receiver may be used for receiving incoming calls. The receiver may be implemented as separate from, or as part of the speaker.

The display module 160 may visually provide information to the outside (e.g., a user) of the electronic device 101.

The display module 160 may include, for example, a display, a hologram device, or a projector and control circuitry to control a corresponding one of the display, hologram device, and projector. The display module 160 may include a touch sensor adapted to detect a touch, or a pressure sensor adapted to measure the intensity of force incurred by the touch.

The audio module 170 may convert a sound into an electrical signal and vice versa. The audio module 170 may obtain the sound via the input module 150, or output the sound via the audio output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes. According to an embodiment, the camera module 180 may include a front camera disposed on the front surface of the electronic device 101 and a rear camera disposed on the rear surface of the electronic device 101.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or a standard of the Infrared Data Association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the electronic devices 102 or 104 may be a device of a same type as, or a different type, from the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
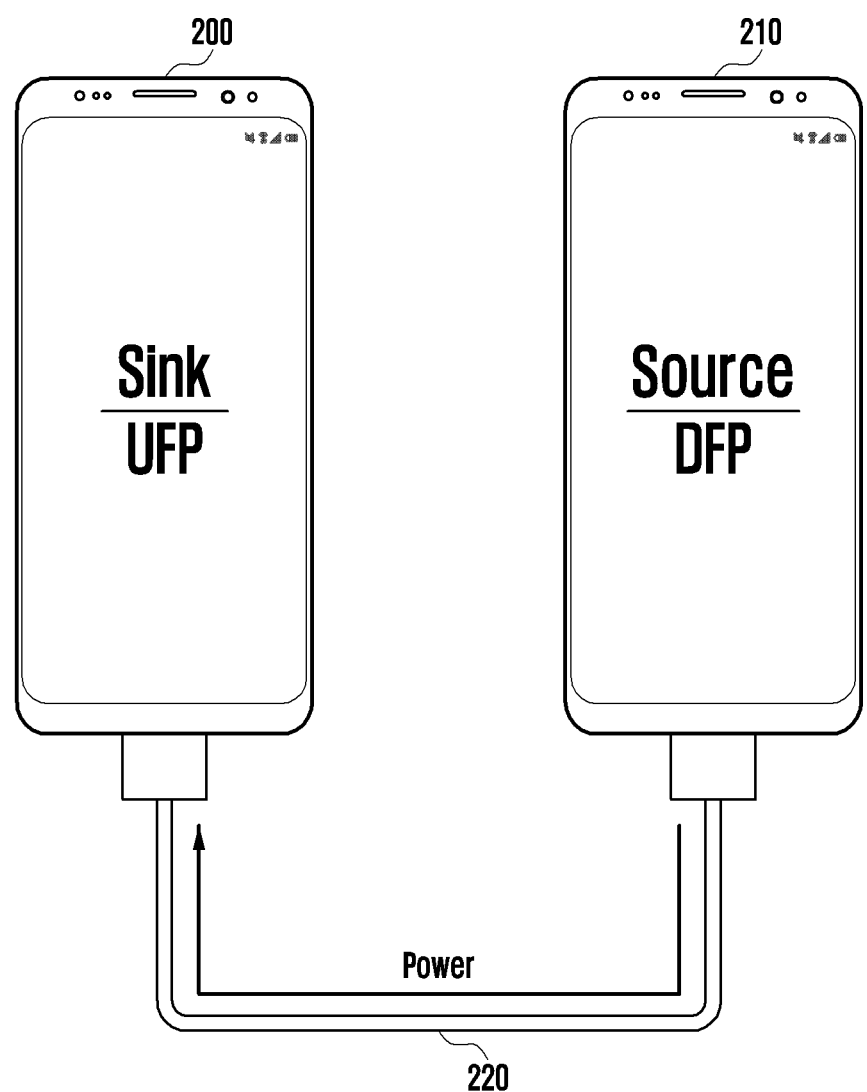
FIG. 2 is a diagram illustrating a situation in which an electronic device and an external electronic device are connected through a USB cable according to an embodiment of the disclosure.

FIG. 2 is a diagram illustrating a situation in which an electronic device 200 and an external electronic device 210 are connected through a USB cable 220 according to an embodiment of the disclosure.

In the following description, the electronic device 200 may be at least partially similar to the electronic device 101 in FIG. 1, or may include other embodiments (not shown) of the electronic device 101. The external electronic device 210 may be at least partially similar to the (external) electronic device 102 in FIG. 1, or may include other embodiments (not shown) of the electronic device 102. The electronic device 200 and the external electronic device 210 may be configured to be substantially the same or at least partially similar.

With reference to FIG. 2, the electronic device 200 may be operably connected to the external electronic device 210 through the cable 220 (e.g., USB Type-C cable, C-to-C cable, or Lightning™ cable). According to an embodiment, the electronic device 200 may be electrically connected to the external electronic device 210 as the cable 220 is connected to a universal serial bus (USB) connection terminal (e.g., connection terminal 178 in FIG. 1) of the electronic device 200. The electronic device 200 and the external electronic device 210 may support bidirectionality of either data and/or power through the cable 220. According to an embodiment, the electronic device 200 and the external electronic device 210 may support an electrical communication connection through the cable 220 (e.g., USB Type-C cable). For example, the electronic device 200 and the external electronic device 210 may supply power through the cable 220 and may transmit and receive data to and from each other.

According to an embodiment, the USB Type-C cable 220 may enable power delivery (PD) communication by using configuration channel (CC) pins (e.g., CC1, CC2). According to an embodiment, when the electronic device 200 and the external electronic device 210 are connected through the USB Type-C cable 220, power role and data role may be assigned. For example, in defining the power role, the device supplying power may be defined as a source device, and the device receiving power may be defined as a sink device. As another example, in defining the data role, the host device may be defined as a downstream facing port (DFP) device, and the client device may be defined as an upstream facing port (UFP) device. According to an embodiment, role assignment for the electronic device 200 and the external electronic device 210 may be variously determined based on resistance values corresponding to either end of the USB Type-C cable 220. For example, the electronic device 200 connected to one end of the USB Type-C cable 220 may identify the resistance value of the external electronic device 210 connected to the other end through the CC pin.

According to an embodiment, when the electronic device 200 identifies an Rd resistor (e.g., pull-down between CC and GND) corresponding to the external electronic device 210 through the CC pin, the electronic device 200 may operate as the source and/or DFP device. According to an embodiment, when the electronic device 200 identifies an Rp resistor (e.g., pull-up between VBUS and CC) corresponding to the external electronic device 210 through the CC pin, the electronic device 200 may operate as the sink and/or UFP device.

According to an embodiment, when the roles for the electronic device 200 and the external electronic device 210 are determined, power delivery messages (PD messages) may be exchanged between them through biphase Manchester coding (BMC) communication. For example, BMC communication may refer to a data transmission standard for communication using the CC pins (CC1, CC2) of the USB Type-C cable 220. According to an embodiment, the electronic device 200 and the external electronic device 210 may independently swap the power role and/or data role by exchanging PD messages.

According to an embodiment, the electronic device 200 may operate as a sink device (power role: sink) for receiving power from the external electronic device 210 and/or a UFP device (data role: UFP) corresponding to a client. The external electronic device 210 may operate as a source device (power role: source) for supplying power to the electronic device 200 and/or a DFP device (data role: DFP) corresponding to a host.

In FIG. 2, the electronic device 200 may be in a state of being operably connected to the external electronic device 210 through the USB Type-C cable 220. For example, when the electronic device 200 is a sink device that receives power from the external electronic device 210 to charge its battery, and the external electronic device 210 is a source device that supplies power to the electronic device 200. According to an embodiment, the electronic device 200 and the external electronic device 210 may support fast charging (e.g. charging at greater than 10 watts). The electronic device 200 may receive power from the external electronic device 210 based on fast charging, and may charge the battery with the power.

Figure 3:
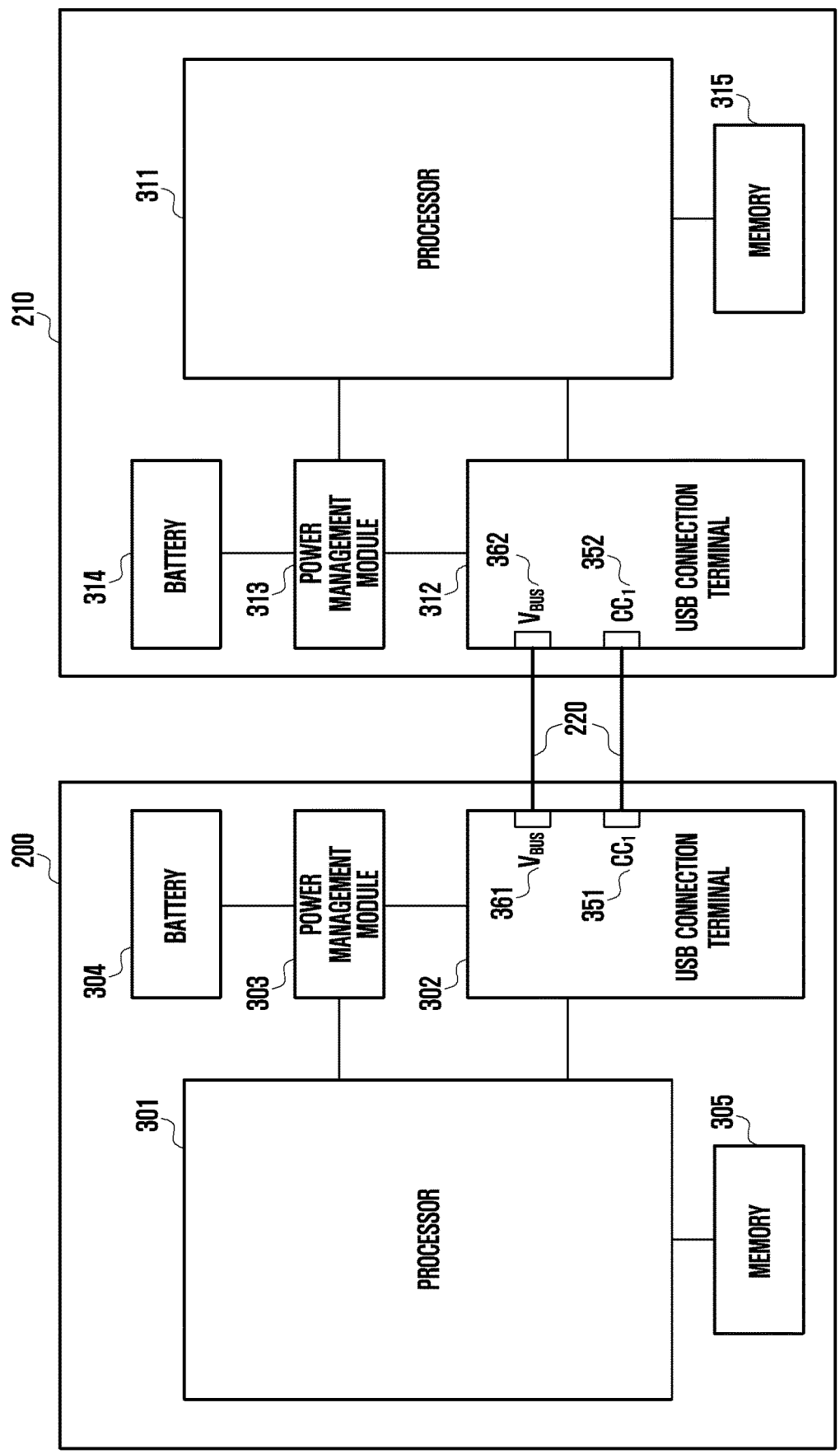
FIG. 3 is a block diagram of the electronic device and the external electronic device according to an embodiment of the disclosure.

FIG. 3 is a block diagram of the electronic device 200 and the external electronic device 210 according to an embodiment of the disclosure.

With reference to FIG. 3, the electronic device 200 (e.g., electronic device 101 in FIG. 1) may include a processor 301 (e.g., processor 120 in FIG. 1), a USB connection terminal 302 (e.g., connection terminal 178 in FIG. 1), a power management module 303 (e.g., power management module 188 in FIG. 1), a battery 304 (e.g., battery 189 in FIG. 1), and a memory 305 (e.g., memory 130 in FIG. 1). The external electronic device 210 may include a processor 311, a USB connection terminal 312, a power management module 313, a battery 314, and a memory 315. According to an embodiment, the electronic device 200 and/or the external electronic device 210 may include a display module (not shown) (e.g., display module 160 in FIG. 1). According to an embodiment, the electronic device 200 and the external electronic device 210 may be configured to be substantially the same or at least partially similar. At least one component of the electronic device 200 may be the same as at least one component of the external electronic device 210. The processor 301 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under as mean-plus-function terms, unless the element is expressly recited using the phrase "means for." In addition, an artisan understands and appreciates that a "processor" or "microprocessor" may be hardware in the claimed disclosure.

According to an embodiment, in the following description, those embodiments described in connection with the USB connection terminal 302 or 312 (e.g., connection terminal 178 in FIG. 1) may also be applied to Lightning™ cable terminals or Thunderbolt™ terminals. However, when applied to Lightning or Thunderbolt, the names of pins (e.g., CC1 pin or CC2 pin) described herein may change.

According to an embodiment, the electronic device 200 may be operably connected to the USB connection terminal 312 of the external electronic device 210 through a cable 220 (e.g., USB Type-C cable) that is connected to the USB connection terminal 302. According to an embodiment, the USB connection terminals 302 and 312 may identify that the counterpart electronic device is connected by using configuration channel (CC) pins 351 and 352 (e.g., CC1 pin or CC2 pin) of the cable 220. For example, the electronic device 200 may recognize the connection of the cable 220 and/or the connection of the external electronic device 210 based on at least one of voltage, current, or impedance detected at the CC pin 351 (e.g., CC1 pin or CC2 pin) of the USB connection terminal 302.

According to an embodiment, when the CC pin 351 (e.g., CC1 pin) of the USB connection terminal 302 is connected to an internal pull-down resistor for a given time, the electronic device 200 may be designated as the sink device and/or the client device (e.g., upstream facing port (UFP) device). When the CC pin 352 (e.g., CC1 pin) of the USB connection terminal 312 is connected to an internal pull-up resistor for a given time, the external electronic device 210 may be designated as the source device and/or the host device (e.g., downstream facing port (DFP) device). Conversely, when the CC pin 351 is connected to a pull-down resistor for a given time in the electronic device 200, the electronic device 200 may be designated as the source device and/or the host device (DFP).

According to an embodiment, when the electronic device 200 operates as the sink device and/or the client device (UFP), it may receive power from the external electronic device 210 through the power supply terminal 361 (e.g., VBUS pins) of the USB connection terminal 302. When the external electronic device 210 operates as the source device and/or the host device (DFP), it may supply power to the electronic device 200 through the power supply terminal 362 (e.g., VBUS pins) of the USB connection terminal 312. According to an embodiment, the electronic device 200 may receive power from the external electronic device 210 and charge the battery 304 through the power management module 303. According to an embodiment, the electronic device 200 may fast charge the battery 304. In another embodiment, when the power supplied from the external electronic device 210 is lower than a specified threshold value, the electronic device 200 may charge the battery 304 based on regular charging or slow charging.

According to an embodiment, the electronic device 200 and the external electronic device 210 may each include a device supporting fast charging through the cable 220.

According to an embodiment, the electronic device 200 may be operably connected to the external electronic device 210 through the cable 220 (e.g., USB Type-C cable). The electronic device 200 may be designated as the sink device and/or the client device (UFP), and the external electronic device 210 may be designated as the source device and/or the host device (DFP). According to an embodiment, the electronic device 200 and the external electronic device 210 may perform fast charging through the cable 220.

According to an embodiment, in response to connection with the external electronic device 210, the electronic device 200 may receive a "discover identity" command from the external electronic device 210. For example, to supply power to the electronic device 200 using fast charging, the external electronic device 210 may make a request for fast charging related information to the electronic device 200.

The "discover identity" command may be a command for requesting fast charging related information from the electronic device 200. According to an embodiment, the fast charging related information may include vendor ID (VID) information, product ID (PID) information, and/or binary coded decimal (BCD) information. According to an embodiment, in response to the request for fast charging related information, the electronic device 200 may provide the fast charging related information to the external electronic device 210. According to an embodiment, based on the fast charging related information (e.g., VID information, PID information, and/or BCD information) received from the electronic device 200, the external electronic device 210 may determine whether the electronic device 200 supports fast charging. According to an embodiment, if the electronic device 200 supports fast charging, the external electronic device 210 may transmit power for fast charging (e.g., power at about 9V) to the electronic device 200. The electronic device 200 may charge (e.g., fast charge) the battery 304 by using the power for fast charging transmitted from the external electronic device 210.

According to an embodiment, while supplying power for fast charging to the electronic device 200, the external electronic device 210 may request a command for entering a first mode for data communication from the electronic device 200. According to an embodiment, the electronic device 200 may transmit a response signal for entering the first mode to the external electronic device 210 and may operate based on the first mode. For example, the first mode may be defined as a mode for performing data communication between the electronic device 200 and the external electronic device 210. According to an embodiment, the electronic device 200 and the external electronic device 210 may perform data communication according to the first mode while performing the fast charging operation. According to an embodiment, the electronic device 200 may identify whether the external electronic device 210 supports fast charging in the first mode. For example, the electronic device 200 may determine whether the external electronic device 210 supports fast charging based on the power data and the entry data into the first mode transmitted from the external electronic device 210. According to an embodiment, the first mode may be an alternate mode. For example, the first mode may be a mode for performing data communication while performing a fast charging operation.

According to an embodiment, in a state where the electronic device 200 (e.g., sink device) receives power from the external electronic device 210 (e.g., source device) and charges the battery 304, a power role swap may occur (e.g., situation in which power roles are exchanged, or a situation in which the charging direction is reversed). When the power role swap occurs, the electronic device 200 may be changed from the sink device to the source device, and the external electronic device 210 may be changed from the source device to the sink device. The electronic device 200 and the external electronic device 210 may swap their roles based on power delivery (PD) communication. According to an embodiment, in the first mode, the electronic device 200 may determine whether the external electronic device 210 supports fast charging, and in response to the power role swap, the electronic device 200 may supply power for fast charging (e.g., about 9V) to the external electronic device 210. According to an embodiment, even when the power role swap occurs, the electronic device 200 and external electronic device 210 performing fast charging may exchange their roles according to the power role swap without causing a malfunction to fast charging. The fast charging direction may be switched between the electronic device 200 and the external electronic device 210. The electronic device 200 (e.g., role swapped to be the source device) may supply power for fast charging to the external electronic device 210 (e.g., role swapped to be the sink device), and the external electronic device 210 may perform fast charging based on the power supplied from the electronic device 200.

According to an embodiment, the electronic device 200 (e.g., electronic device 101) may include a power management module 303 (e.g., power management module 188 in FIG. 1), a USB connection terminal 302 (e.g., connection terminal 178 in FIG. 1), a processor 301 (e.g., processor 120 in FIG. 1) operably connected to the power management module 303 and the USB connection terminal 302, and a memory 305 (e.g., memory 130 in FIG. 1) operably connected to the processor 301. The memory 305 may store instructions that, when executed, cause the processor 301 to: provide, in response to connection with an external electronic device 210 through the USB connection terminal 302, fast charging related information to the external electronic device 210; obtain power from the external electronic device 210 based on the fast charging related information; perform a fast charging operation through the power management module 303 based on the obtained power; determine to enter a first mode for data communication with the external electronic device 210; and determine whether fast charging is possible in the external electronic device 210 according to the obtained power and the entry into the first mode by the electronic device and the external electronic device.

According to an embodiment, the processor 301 may check the connection with the external electronic device 210 based on a USB cable (e.g., cable 220 in FIG. 3) that is connected to the USB connection terminal 302.

According to an embodiment, the USB cable 220 may be a USB Type-C cable, and the electronic device 200 and the external electronic device 210 may support a USB Type-C cable.

According to an embodiment, the processor 301 may provide a list of at least one supportable mode to the external electronic device 210 in response to a request from the external electronic device 210, and may determine to enter the first mode based on the selection by the external electronic device 210.

According to an embodiment, the processor 301 may determine that fast charging is possible in the external electronic device 210 based on a first condition of receiving power for fast charging from the external electronic device 210 and a second condition of the entry into the first mode.

According to an embodiment, while the electronic device 200 supplies power to the external electronic device 210 in response to a power role swap command, the processor 301 may maintain data communication in the first mode.

According to an embodiment, the processor 301 may transmit, in response to the power role swap command, a request signal corresponding to the power role swap command to the external electronic device 210 through a first pin of the USB connection terminal 302, and may supply power for fast charging the external electronic device 210 to the external electronic device 210 in response to receiving a response signal for the request signal.

According to an embodiment, the first pin may be a configuration channel (CC) pin.

According to an embodiment, the external electronic device 210 (e.g., electronic device 102 in FIG. 1) may include a power management module 313, a USB connection terminal 312, a processor 311 operably connected to the power management module 313 and the USB connection terminal 312, and a memory 315 operably connected to the processor 311. The memory 315 may store instructions that, when executed, cause the processor 311 to: request, in response to connection with an electronic device 200 through the USB connection terminal 312, fast charging related information from the electronic device 200; obtain fast charging related information from the electronic device 200; determine whether to perform a fast charging operation based on the obtained fast charging related information; supply power to the electronic device 200 through the power management module 313 based on the obtained fast charging related information to perform the fast charging operation; request, for data communication with the electronic device 200, the electronic device 200 to enter a first mode; and perform data communication with the electronic device 200 in the first mode according to the request.

According to an embodiment, while receiving power for fast charging from the electronic device 200 in response to a power role swap command, the processor 311 may maintain data communication in the first mode.

According to an embodiment, in response to the power role swap command, the processor 311 may receive power from the electronic device 200, and perform another fast charging operation through the power management module 313 based on the received power.

Figure 4:
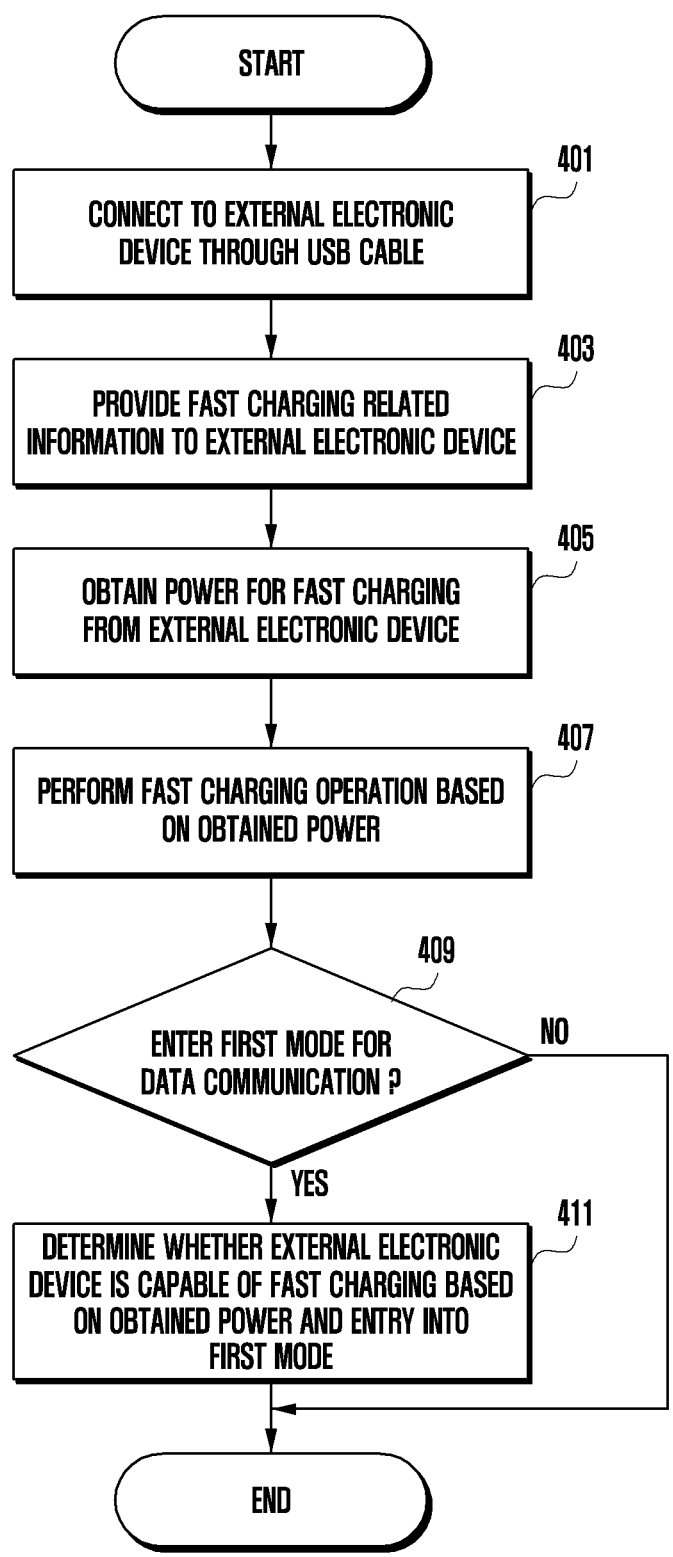
FIG. 4 is a flowchart illustrating a method of checking whether an external electronic device supports fast charging according to an embodiment of the disclosure.

FIG. 4 is a flowchart illustrating a method of checking whether an external electronic device supports fast charging according to an embodiment of the disclosure. In the following embodiment, operations may be performed in sequence as shown, but are not necessarily performed in the shown sequence. For example, the order of operations may be changed, and at least two operations may be performed in parallel. Here, the electronic device may include the electronic device 101 in FIG. 1 and/or the electronic device 200 in FIG. 3.

According to an embodiment, the electronic device 200 may be operably connected to the external electronic device (e.g., external electronic device 210 in FIG. 3) through a USB cable (e.g., cable 220 in FIG. 3, USB Type-C cable) that is connected to the USB connection terminal 302. According to an embodiment, the electronic device 200 and the external electronic device 210 may be configured to be substantially the same or at least partially similar. The electronic device 200 may receive power from the external electronic device 210, and may charge the battery (e.g., battery 304 in FIG. 3) (e.g., via fast charging) through a power management module (e.g., power management module 303 in FIG. 3) based on the received power.

At operation 401, the processor (e.g., processor 301 in FIG. 3) of the electronic device 200 may be operably connected to the external electronic device 210 through the USB cable 220. For example, the USB cable 220 may correspond to a USB Type-C cable, and the processor 301 may check the connection with the external electronic device 210 through a configuration channel (CC) pin (e.g., CC1 pin or CC2 pin) of the USB cable 220. According to an embodiment, when the electronic device 200 and the external electronic device 210 are connected through the USB cable 220, roles such as the power role and data role may be assigned to them. In FIG. 4, the electronic device 200 may be configured as the sink device receiving power and the upstream facing port (UFP) device serving as a client, and the external electronic device 210 may be configured as the source device supplying power and the downstream facing port (DFP) device serving as a host. According to an embodiment, the external electronic device 210 as the host may request fast charging related information from the electronic device 200 when it is connected to the electronic device 200 through the USB cable 220. For example, the external electronic device 210 may transmit a "discover identity" command to the electronic device 200 and obtain fast charging related information of the electronic device 200 from the electronic device 200.

At operation 403, the electronic device 200 may provide fast charging related information to the external electronic device 210 in response to the request from the external electronic device 210. For example, the fast charging related information may include vendor ID (VID) information, product ID (PID) information, and/or binary coded decimal (BCD) information. According to an embodiment, the external electronic device 210 may identify whether the electronic device 200 supports fast charging and/or the power value for fast charging on the basis of the fast charging related information of the electronic device 200. For example, the external electronic device 210 may identify the power value (e.g., about 9V) for fast charging based on the BCD information of the electronic device 200. According to an embodiment, the external electronic device 210 may provide power for fast charging to the electronic device 200. According to another embodiment, the external electronic device 210 may check whether the electronic device 200 supports fast charging on the basis of the fast charging related information of the electronic device 200. If the electronic device 200 does not support fast charging, the external electronic device 210 may provide power for normal charging or may not provide charging power at all.

At operation 405, the electronic device 200 may obtain power for fast charging the battery 304 from the external electronic device 210. According to another embodiment, when obtaining fast charging power from the external electronic device 210, the electronic device 200 may confirm that the external electronic device 210 is a device operable based on the corresponding power. For example, the electronic device 200 may determine that the external electronic device 210 can receive the corresponding power. According to another embodiment, when the power received from the external electronic device 210 is lower than a preset threshold, the electronic device 200 may charge the battery 304 according to normal charging or slow charging.

At operation 407, the electronic device 200 may perform fast charging of the battery 304 based on the power obtained from the external electronic device 210. According to the power role, the electronic device 200 operates as the sink device, and the external electronic device 210 operates as the source device.

At operation 409, the electronic device 200 may enter a first mode for data communication with the external electronic device 210. According to an embodiment, in the first mode, the electronic device 200 may operate as the UFP device, and the external electronic device 210 may operate as the DFP device. For example, in the first mode, the electronic device 200 and the external electronic device 210 may perform data-related communication and exchange data (e.g., fast charging related information) with each other. According to an embodiment, the electronic device 200 and the external electronic device 210 may operate in a plurality of modes, and may perform data communication in the first mode among the plurality of modes. According to an embodiment, the first mode may be an alternate mode. For example, the first mode may be a mode for performing data communication while performing fast charging. According to another embodiment, the electronic device 200 may display a user interface for entering the first mode on the display module (e.g., display module 160 in FIG. 1). In response to a user input to the user interface, the electronic device 200 may enter the first mode.

At operation 411, the electronic device 200 may determine whether the external electronic device 210 is capable of fast charging based on the power obtained from the external electronic device 210 (e.g., first condition) and entry into the first mode by the external electronic device 210 (e.g., second condition). For example, based on the obtained power, the electronic device 200 may identify that the power is usable in the external electronic device 210. As the external electronic device 210 can enter the first mode, the electronic device 200 may determine that the external electronic device 210 can perform fast charging. According to an embodiment, when the obtained power (e.g., first condition) and the entry into the first mode (e.g., second condition) are satisfied, the electronic device 200 may determine that fast charging is possible in the external electronic device 210.

According to an embodiment, while the electronic device 200 is performing fast charging, a power role swap may occur (e.g., swapping roles for supplying power, swapping roles between sink and source devices), in which case the electronic device 200 may be switched from the sink device to the source device and the external electronic device 210 may be switched from the source device to the sink device. According to an embodiment, the power role swap may be caused by at least one of the electronic device 200 or the external electronic device 210. For example, the electronic device 200 may display a user interface for power role swap and perform the power role swap in response to a user input.

Figure 5:
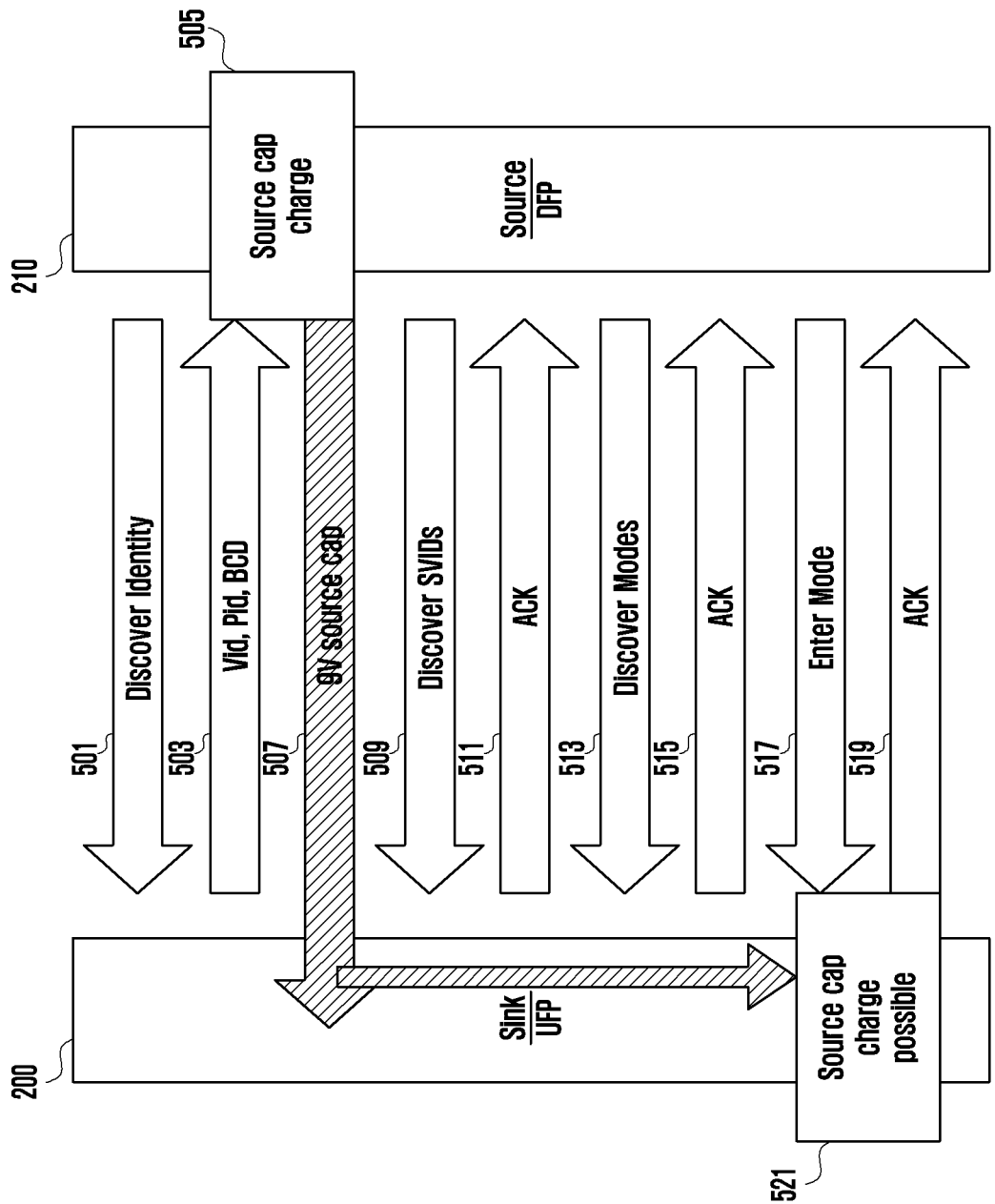
FIG. 5 is an illustrative diagram depicting a process of checking whether an external electronic device supports fast charging according to an embodiment of the disclosure.

FIG. 5 is an illustrative diagram depicting a process of checking whether the external electronic device supports fast charging according to an embodiment of the disclosure.

According to an embodiment, the electronic device 200 may be operably connected to the external electronic device (e.g., external electronic device 210 in FIG. 3) through a USB cable (e.g., cable 220 in FIG. 3, USB Type-C cable) that is connected to the USB connection terminal 302. According to an embodiment, the electronic device 200 and the external electronic device 210 may be configured to be substantially the same or at least partially similar. The electronic device 200 may receive power from the external electronic device 210 and may charge the battery (e.g., battery 304 in FIG. 3) through a power management module (e.g., power management module 303 in FIG. 3) based on the received power.

In FIG. 5, the electronic device 200 may operate as the sink device (e.g., device receiving power) according to its assigned power role, and may operate as the UFP device (e.g., client device) according to its assigned data role. The external electronic device 210 may operate as the source device (e.g., device that supplies power) according to its assigned power role, and may operate as the DFP device (e.g., host device) according to its assigned data role.

With reference to FIG. 5, when the electronic device 200 and the external electronic device 210 are connected to each other through the USB cable 220, at operation 501, the external electronic device 210 may transmit a "discover identity" command to the electronic device 200. For example, the external electronic device 210 as the source device may be in a state of requesting fast charging related information for performing fast charging from the electronic device 200.

At operation 503, the electronic device 200 may transmit fast charging related information (e.g., vendor ID (VID) information, product ID (PID) information, and/or binary coded decimal (BCD) information) to the external electronic device 210 in response to the request (e.g., request at operation 501) of the external electronic device 210. At operation 505, the external electronic device 210 may identify the power value for fast charging in the electronic device 200 based on the fast charging related information obtained from the electronic device 200. According to another embodiment, the fast charging related information may include manufacturer information corresponding to the electronic device 200.

At operation 507, to fast charge the electronic device 200, the external electronic device 210 may provide fast charging power (e.g., power capped at 9V) to the electronic device 200. According to an embodiment, the electronic device 200 may charge the battery 304 by using the fast charging power provided from the external electronic device 210.

At operation 509, the external electronic device 210 as the DFP device may request a list of standard vendor IDs (SVIDs) from the electronic device 200 through a "discover SVIDs" command. At operation 511, the electronic device 200 may provide an SVID list in response to the request (e.g., request at operation 509) of the external electronic device 210.

At operation 513, the external electronic device 210 may select at least one mode (e.g., first mode) based on the SVID list provided from the electronic device 200, and may transmit a "discover modes" command to the electronic device 200 to check whether the selected at least one mode is executable. At operation 515, the electronic device 200 may transmit a response signal indicating that the selected mode is executable in response to the request (e.g., request at operation 513) of the external electronic device 210.

At operation 517, the external electronic device 210 may transmit an "enter mode" command to the electronic device 200 to enter the selected mode (e.g., first mode). At operation 519, the electronic device 200 may enter the selected mode (e.g., first mode) in response to the request (e.g., request at operation 517) of the external electronic device 210. The electronic device 200 and the external electronic device 210 may enter the first mode and perform data communication with each other based on the first mode.

At operation 521, the electronic device 200 may determine whether the external electronic device 210 is capable of fast charging based on the condition (e.g., first condition) of obtaining fast charging power at operation 507 and the entry condition (e.g., second condition) into the first mode at operations 509 to 519. For example, when both the first condition and the second condition are satisfied, the external electronic device 210 may determine that the external electronic device 210 is capable of fast charging and perform a fast charging operation on the battery (e.g., battery 314 in FIG. 3) of the external electronic device 210.

According to an embodiment, the electronic device 200 may receive power for fast charging from the external electronic device 210 and perform fast charging on the battery 304. When the electronic device 200 is performing fast charging, a power role swap may occur (e.g., exchange of roles to supply power, exchange of roles between sink and source devices, change of power supply agent), and the electronic device 200 may switch from being the sink device to the source device. With reference to FIG. 5, the electronic device 200 and the external electronic device 210 may be in a state of having exchanged information that fast charging is possible with each other. According to an embodiment, in response to the occurrence of a power role swap, the external electronic device 210 may receive power for fast charging from the electronic device 200 and perform fast charging of the battery 314.

According to another embodiment, the electronic device 200 and/or the external electronic device 210 may operate in the first mode and exchange data with each other. According to another embodiment, based on the first mode, the electronic device 200 and the external electronic device 210 may perform vendor defined message (VDM) communication and exchange commands for testing. For example, the electronic device 200 and the external electronic device 210 may transmit and receive commands for testing based on universal asynchronous receiver and transmitter (UART) communication for terminal testing. UART communication can be defined as communication in which data is transmitted by converting data in parallel data form into data in serial data form. According to another embodiment, the electronic device 200 and the external electronic device 210 may perform VDM communication according to the first mode in place of the UART communication, and may exchange commands for testing with each other. For example, the electronic device 200 and the external electronic device 210 may perform VDM communication based on the CC pin of the USB cable 220 and exchange commands for testing based on the CC pin. The electronic device 200 and the external electronic device may provide a user interface for terminal testing to the user. According to another embodiment, as VDM communication according to the first mode replaces the UART communication, the electronic device 200 and the external electronic device 210 may not require a component (e.g., integrated circuit (IC)) for UART communication. According to another embodiment, the manufacturing cost of the electronic device 200 and the external electronic device 210 may be reduced.

Figure 6:
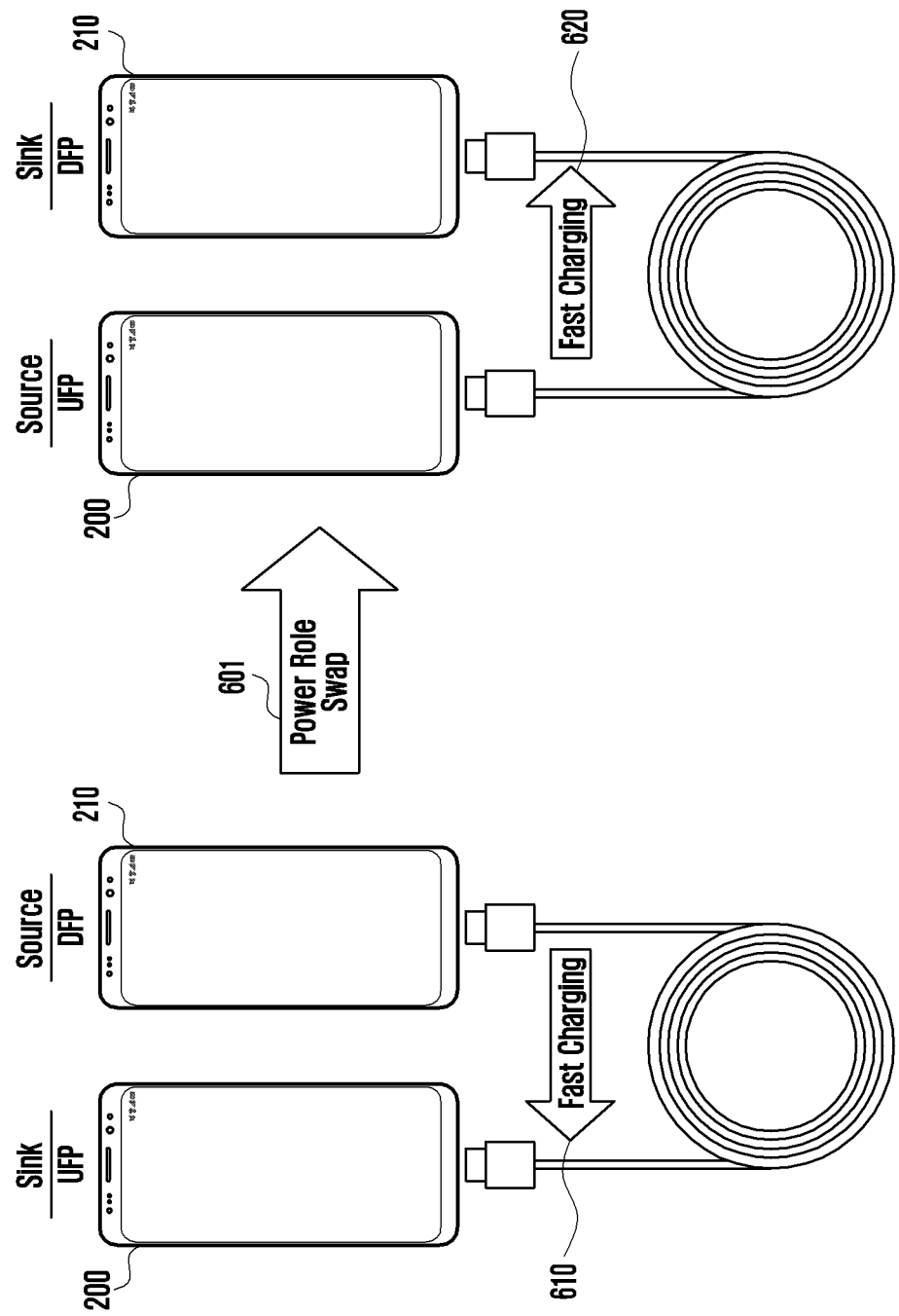
FIG. 6 is an illustrative diagram depicting a situation in which the power supply agent is swapped between the electronic device and the external electronic device according to an embodiment of the disclosure.

FIG. 6 is an illustrative diagram depicting a situation in which the power supply agent is swapped between the electronic device and the external electronic device according to an embodiment of the disclosure.

With reference to FIG. 6, the electronic device 200 may operate as the sink device (e.g., device receiving power) according to its power role, and may operate as the UFP device (e.g., client device) according to its data role. The external electronic device 210 may operate as the source device (e.g., device that supplies power) according to its power role, and may operate as the DFP device (e.g., host device) according to its data role. At operation 610, the electronic device 200 may receive power for fast charging from the external electronic device 210 and may be in a state of performing fast charging based on the power.

In FIG. 6, while the electronic device 200 is charging its battery (e.g., battery 304 in FIG. 3), "power role swap" may occur at operation 601. The power supply agent may change between the electronic device 200 and the external electronic device 210 according to "power role swap." For example, the electronic device 200 previously being the sink device may be switched to be the source device, and the external electronic device 210 previously being the source device may be switched to the sink device. According to an embodiment, the change in the power supply agent may be interpreted as a change in the direction of fast charging. For example, the state in which the external electronic device 210 fast-charges the electronic device 200 at operation 610 may be changed to a state in which the electronic device 200 fast-charges the external electronic device 210 at operation 620. According to an embodiment, even if the power supply agent is changed according to "power role swap," the data role may be not changed. For example, the electronic device 200 previously being the UFP device may remain as the UFP device, and the external electronic device 210 previously being the DFP device may also remain as the DFP device. At operation 620, as the power role is swapped, there may be a state change where the electronic device 200 supplies power for fast charging to the external electronic device 210 and the external electronic device 210 performs fast charging based on the power.

Figure 7:
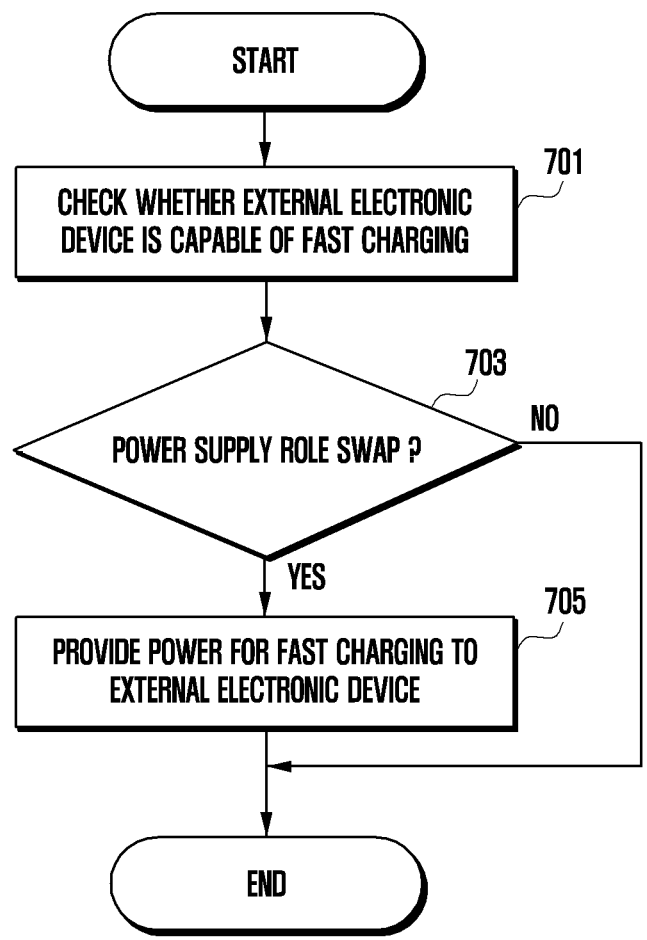
FIG. 7 is a flowchart illustrating a process in which the power supply agent is swapped according to an embodiment of the disclosure.

FIG. 7 is a flowchart illustrating a process in which the power supply agent is swapped according to an embodiment of the disclosure.

According to an embodiment, the electronic device (e.g., electronic device 200 in FIG. 3) may operate as the sink device (e.g., device receiving power) according to its power role, and the external electronic device (e.g., external electronic device 210 in FIG. 3) may operate as the source device (e.g., device that supplies power) according to its power role. According to an embodiment, the electronic device 200 may receive power for fast charging from the external electronic device 210.

With reference to FIG. 7, the electronic device 200 may receive power from the external electronic device 210 and perform fast charging based on the power. At operation 701, the electronic device 200 may check whether the external electronic device 210 is capable of fast charging. According to an embodiment, when a condition in which the electronic device 200 receives power for fast charging (e.g., about 9V) from the external electronic device 210 (e.g., first condition) and a condition for entering the first mode with the external electronic device 210 (e.g., second condition) are satisfied, the electronic device 200 may determine that the external electronic device 210 supports fast charging. For example, the fact that the external electronic device 210 supports fast charging may be interpreted as that the external electronic device 210 can receive external power and fast charge its own battery (e.g., battery 314 in FIG. 3).

At operation 703, the electronic device 200 and the external electronic device 210 may switch the power supply role according to a "power role swap" command. For example, the power supply agent for charging may be changed. For example, the electronic device 200 may be changed from being the sink device to the source device, and the external electronic device 210 may be changed from being the source device to the sink device. According to an embodiment, a "power role swap" command may be generated based on a user input or may be generated when a specified condition is satisfied between the electronic device 200 and the external electronic device 210. For example, the electronic device 200 and the external electronic device 210 may provide a user interface for "power role swap" to the user, and "power role swap" may be generated according to a user input. As another example, the external electronic device 210 being the host device may compare a first capacity of the battery 304 of the electronic device 200 with a second capacity of the battery 314 of the external electronic device 210, and a "power role swap" command may be generated when the difference between the first capacity and the second capacity exceeds a preset threshold.

According to an embodiment, when the "power role swap" command is generated, the electronic device 200 and the external electronic device 210 may perform fast charging as the source device and as the sink device, respectively. For example, "power role swap" may cause a change in the power supply agent but may maintain the fast charging operation continuously.

A method according to an embodiment may include: providing, in a state where an electronic device (e.g., electronic device 200 in FIG. 3) and an external electronic device (e.g., external electronic device 210 in FIG. 3) are connected through a USB cable (e.g., cable 220 in FIG. 3), by the electronic device 200, fast charging related information to the external electronic device 210 in response to a request of the external electronic device 210; obtaining, by the electronic device 200, power from the external electronic device 210 based on the provided fast charging related information; performing, by the electronic device 200, a fast charging operation based on the obtained power; entering a first mode for data communication between the electronic device 200 and the external electronic device 210; and determining, by the electronic device 200, whether fast charging is possible in the external electronic device 210 based on the obtained power and the entry into the first mode by the electronic device and the external electronic device.

According to an embodiment, the method may further include displaying, by the electronic device 200, a user interface for entering the first mode.

According to an embodiment, the USB cable 220 may be a USB Type-C cable, and the USB Type-C cable may be supported by the electronic device and the external electronic device.

According to an embodiment, the entering into the first mode may include: providing, by the electronic device, a list of at least one supportable mode to the external electronic device 210 in response to another request from the external electronic device 210; and determining, by the electronic device, to enter the first mode based on a selection by the external electronic device 210.

According to an embodiment, determining whether fast charging is possible in the external electronic device 210 may include determining that fast charging is possible in the external electronic device 210 based on a first condition in which the electronic device 200 receives power for fast charging from the external electronic device 210 and a second condition in which the electronic device 200 and the external electronic device 210 enter the first mode.

According to an embodiment, the method may further include: obtaining, by at least one of the electronic device 200 or the external electronic device 210, a power role swap command; supplying, by the electronic device 200, power for fast charging to the external electronic device 210 according to the power role swap command; and maintaining data communication in the first mode while the power for fast charging is supplied by the electronic device.

According to an embodiment, the method may further include: transmitting, by the electronic device 200 in response to the power role swap command, a request signal for power role swap to the external electronic device 210 through a first pin of the USB cable 220; receiving, by the electronic device 200, a response signal corresponding to the request signal; and supplying, by the electronic device 200 in response to reception of the response signal, the power for fast charging the external electronic device 210 to the external electronic device 210.

According to an embodiment, the first pin may be a configuration channel (CC) pin.

According to an embodiment, the method may further include: receiving, by the external electronic device 210, the power for fast charging from the electronic device 200; and performing fast charging through a power management module of the external electronic device 210 based on the received power.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The embodiments of the present disclosure and the accompanying drawings are only examples in order to easily describe the present disclosure and facilitate comprehension of the present disclosure, but are not intended to limit the scope of the present disclosure. Therefore, in addition to the embodiments disclosed herein, the scope of the present disclosure should be construed to include all modifications or modified forms drawn based on the present disclosure and is defined by the appended claims and their equivalents.

The invention claimed is:

1. An electronic device comprising:
a power management module;
a USB connection terminal;
a processor operably connected to the power management module and the USB connection terminal; and
a memory operably connected to the processor,
wherein the memory stores instructions that, when executed, cause the processor to:
provide, in response to connection with an external electronic device through the USB connection terminal, fast charging related information to the external electronic device;
obtain power based on the fast charging related information from the external electronic device;
perform a fast charging operation through the power management module based on the obtained power;
determine to enter a first mode for data communication with the external electronic device; and
determine whether fast charging is possible in the external electronic device based on the obtained power and an entry into the first mode by the external electronic device.

2. The electronic device of claim 1, wherein the instructions further cause the processor to check the connection with the external electronic device based on a USB cable that is connected to the USB connection terminal.

3. The electronic device of claim 2, wherein:
the USB cable is a USB Type-C cable; and
the electronic device and the external electronic device support the USB Type-C cable.

4. The electronic device of claim 1, wherein the instructions further cause the processor to:
provide a list of at least one supportable mode to the external electronic device in response to a request from the external electronic device; and
determine to enter the first mode based on a selection by the external electronic device.

5. The electronic device of claim 1, wherein the instructions further cause the processor to determine that fast charging is possible in the external electronic device based on a first condition of receiving power for fast charging from the external electronic device and a second condition of the entry into the first mode.

6. The electronic device of claim 1, wherein while the electronic device supplies power to the external electronic device in response to a power role swap command, the instructions further cause the processor to maintain data communication in the first mode.

7. The electronic device of claim 6, wherein the instructions further cause the processor to:
transmit, in response to the power role swap command, a request signal corresponding to the power role swap command to the external electronic device through a first pin of the USB connection terminal; and
supply, in response to reception of a response signal for the request signal, power for fast charging the external electronic device to the external electronic device.

8. The electronic device of claim 7, wherein the first pin is a configuration channel (CC) pin.

9. An external electronic device comprising:
a power management module;
a USB connection terminal;
a processor operably connected to the power management module and the USB connection terminal; and
a memory operably connected to the processor,
wherein the memory stores instructions that, when executed, cause the processor to:
request, in response to connection with an electronic device through the USB connection terminal, fast charging related information from the electronic device;
obtain fast charging related information from the electronic device;

determine whether to perform a fast charging operation based on the obtained fast charging related information;

supply power to the electronic device through the power management module based on the obtained fast charging related information to perform the fast charging operation;

request, for data communication with the electronic device, the electronic device to enter a first mode; and perform data communication with the electronic device in the first mode according to the request.

10. The external electronic device of claim 9, wherein while receiving power for fast charging from the electronic device in response to a power role swap command, the instructions further cause the processor to maintain data communication in the first mode.

11. The external electronic device of claim 10, wherein the instructions further cause the processor to:

receive power from the electronic device in response to the power role swap command; and perform another fast charging operation through the power management module based on the received power.

12. A method comprising:

providing, in a state where an electronic device and an external electronic device are connected through a USB cable, by the electronic device, fast charging related information to the external electronic device in response to a request of the external electronic device;

obtaining, by the electronic device, power based on the provided fast charging related information from the external electronic device;

performing, by the electronic device, a fast charging operation based on the obtained power;

entering a first mode for data communication between the electronic device and the external electronic device; and determining, by the electronic device, whether fast charging is possible in the external electronic device based on the obtained power and an entry into the first mode by the electronic device and the external electronic device.

13. The method of claim 12, further comprising displaying, by the electronic device, a user interface for entering the first mode.

14. The method of claim 12, wherein the USB cable is a USB Type-C cable, and the USB Type-C cable is supported by the electronic device and the external electronic device.

15. The method of claim 12, wherein entering the first mode further comprises:

providing, by the electronic device, a list of at least one supportable mode to the external electronic device in response to another request from the external electronic device; and determining, by the electronic device, to enter the first mode based on a selection by the external electronic device.

16. The method of claim 12, wherein determining whether fast charging is possible in the external electronic device further comprises determining that fast charging is possible in the external electronic device based on a first condition in which the electronic device receives power for fast charging from the external electronic device and a second condition in which the electronic device and the external electronic device enter the first mode.

17. The method of claim 12, further comprising:

obtaining, by the electronic device and/or the external electronic device, a power role swap command;

supplying, by the electronic device, power for fast charging to the external electronic device according to the power role swap command; and maintaining data communication in the first mode while the power for fast charging is supplied by the electronic device.

18. The method of claim 17, further comprising:

transmitting, by the electronic device in response to the power role swap command, a request signal for power role swap to the external electronic device through a first pin of the USB cable;

receiving, by the electronic device, a response signal corresponding to the request signal; and supplying, by the electronic device in response to reception of the response signal, the power for fast charging the external electronic device to the external electronic device.

19. The method of claim 18, wherein the first pin is a configuration channel (CC) pin.

20. The method of claim 17, further comprising:

receiving, by the external electronic device, the power for fast charging from the electronic device; and performing fast charging through a power management module of the external electronic device based on the received power.

* * * * *